(12) United States Patent
Russell

(10) Patent No.: US 7,186,327 B1
(45) Date of Patent: Mar. 6, 2007

(54) METHOD AND APPARATUS FOR SCALING CONTROL AND IN-SITU CATHODIC PROTECTION

(76) Inventor: Larry L. Russell, 200 Martinique Ave., Tiburon, CA (US) 94920

( * ) Notice: Subject to any disclaimer, the term of this patent is extended or adjusted under 35 U.S.C. 154(b) by 472 days.

(21) Appl. No.: 10/200,059

(22) Filed: Jul. 18, 2002

Related U.S. Application Data

(63) Continuation-in-part of application No. 09/634,164, filed on Aug. 9, 2000, now Pat. No. 6,423,208, which is a continuation-in-part of application No. 09/160,825, filed on Sep. 25, 1998, now Pat. No. 6,103,097.

(60) Provisional application No. 60/060,404, filed on Sep. 30, 1997.

(51) Int. Cl.
*C25D 5/54* (2006.01)

(52) U.S. Cl. .................. 205/85; 205/316; 205/320; 205/730; 205/735; 205/736; 205/740

(58) Field of Classification Search ................ 205/730, 205/735, 736, 740, 84, 316, 320; 204/196.01, 204/196.04, 196.11, 196.15, 196.26, 196.37, 204/196.38, 196.16
See application file for complete search history.

(56) References Cited

U.S. PATENT DOCUMENTS

| | | | | |
|---|---|---|---|---|
| 1,842,541 A | | 1/1932 | Cumberland | |
| 3,689,395 A | | 9/1972 | Blount et al. | 204/196 |
| 4,246,075 A | * | 1/1981 | Hilbertz | 205/107 |
| 4,457,821 A | | 7/1984 | Sudrabin et al. | 204/196 |
| 4,826,577 A | | 5/1989 | Lange | 204/1 |
| 4,855,029 A | | 8/1989 | Gazda et al. | 204/196 |
| 4,975,560 A | | 12/1990 | Wardy | 219/322 |
| 4,990,231 A | | 2/1991 | Stewart et al. | 204/196 |
| 5,006,214 A | | 4/1991 | Burchnell et al. | 204/196 |
| 5,776,334 A | | 7/1998 | Cho | 210/138 |
| 5,895,763 A | | 4/1999 | Edstrand et al. | 438/55 |
| 6,085,376 A | | 7/2000 | Antal et al. | 15/104.061 |
| 6,103,097 A | | 8/2000 | Russell | 205/724 |
| 6,423,208 B1 | | 7/2002 | Russell | 205/730 |
| 6,506,295 B1 | * | 1/2003 | Takahashi et al. | 205/725 |

* cited by examiner

*Primary Examiner*—Bruce F. Bell
(74) *Attorney, Agent, or Firm*—Karry W. Wang, Esq.; Law Offices of K.W. Wang

(57) ABSTRACT

A method and apparatus wherein an electrically conductive element is placed inside a previously installed metallic water vessel such as a supply pipe or well. A direct current voltage is then applied between the element and the conductive wall of the vessel. The conductive element can be a partially insulated wire. For causing deposition on the vessel, the voltage applied to the conductive element is of an amount sufficient to cause the potential of the metallic vessel to be lowered below the potential of the element by at least −0.3 volts, and more adequately −1.3 volts. An alternative embodiment involves reversing the polarity of the voltage applied between the conductive element and the vessel, causing the oxidation/reduction reaction to reverse, resulting in calcium carbonate being removed from the vessel by the production of acid at the surface of the vessel.

5 Claims, 2 Drawing Sheets

METHOD AND APPARATUS FOR SCALING CONTROL AND IN-SITU CATHODIC PROTECTION

1. BACKGROUND OF THE INVENTION

Figure 1:
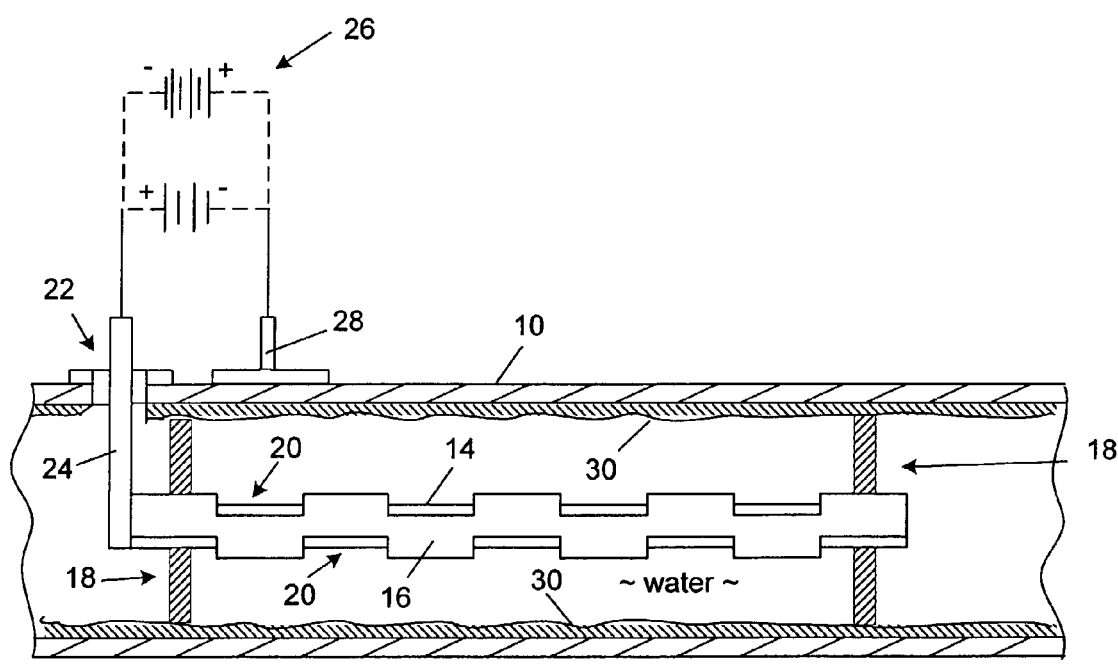

This application is a continuation-in-part of the U.S. patent application Ser. No. 09/634,164 filed Aug. 9, 2000 now U.S. Pat. No. 6,423,208, which is a continuation of U.S. patent application Ser. No. 09/160,825 filed Sep. 25, 1998 (now U.S. Pat. No. 6,103,097), claims priority from U.S. Provisional Patent Application Ser. No. 60/060,404 filed Sep. 30, 1997. The disclosures of each of these applications is incorporated herein by reference.

2. FIELD OF THE INVENTION

The present invention relates generally to domestic and industrial water supply and product piping systems, and more particularly to methods and apparatus for controlling corrosion and deposition in domestic and industrial water supply piping fixtures and wells.

3. DESCRIPTION OF THE PRIOR ART

The deposition of minerals in water supply pipes is a well known problem that has received a great deal of attention. Hard water contains calcium and other dissolved minerals that deposit on the interior of pipes, restricting water flow and causing control valves to malfunction. Removing mineral deposits can be an involved and costly process. Mechanical procedures such as scraping and sandblasting require at least some disassembly of the pipe system, and thereby interrupting operation of the system. A mechanical cleaning apparatus is described in U.S. Pat. No. 6,085,376. The use of chemicals to clean water pipes is described in U.S. Pat. No. 5,895,763. There are significant safety issues in the chemical removal of calcium carbonate, which can generate significant quantities of carbon dioxide gas, known to explode and blow apart pipes being cleaned.

U.S. Pat. No. 5,776,334 describes a method for controlling precipitation in pipes by placing a coil supplied with an alternating current outside of a pipe. This method is difficult or impossible to implement in many existing water supply systems, such as in homes wherein water piping is enclosed within walls or in concrete flooring and very likely will not achieve any significant scale control due to the unknown impact of electromagnetic fields on precipitation of inorganic salts such as calcium carbonate.

U.S. Pat. No. 6,103,097 describes a method for providing cathodic protection in a lead pipe water system. The special requirements involved in lead cathodic protection are not required for the protection of steel and other non-ferrous piping materials.

In view of the prior art, it is clear that there is a need for a method of controlling the deposition of calcium carbonate in pipes and a need for a convenient and safe method of removal of deposits from pipes.

4. SUMMARY

It is therefore an object of the present invention to provide an improved method and apparatus for control of calcium carbonate deposition in pipes.

It is a further object of the present invention to provide a method and apparatus for control of corrosion in water conveyance and supply pipelines and wells.

It is another object of the present invention to provide a method and apparatus for controlling deposition of calcium carbonate and corrosion in water supply pipes that does not require access to the exterior of the pipe within walls and flooring systems.

It is still a further object of the present invention to provide a method and apparatus for controlling mineral deposition and corrosion in water supply piping by placing an electrical conductor inside the pipe with a direct current voltage applied.

It is another object of the present invention to provide a method and apparatus for depositing a corrosion resistant scale on the wall of a pipe.

Briefly, a preferred embodiment of the present invention includes a method and apparatus wherein an electrically conductive element is placed inside a previously installed metallic water vessel, such as a supply pipe or well. A direct current voltage is then applied between the element and the conductive wall of the vessel. The conductive element is preferably a partially insulated wire. For causing deposition on the vessel, the voltage applied to the wire is of an amount sufficient to cause the potential of the metallic vessel to be lowered below the potential of the wire by at least −0.3 volts, and more effectively −1.3 volts. An alternative embodiment involves reversing the polarity of the voltage applied between the conductive element and the vessel casing, causing the oxidation/reduction reaction to reverse, resulting in calcium carbonate being removed from the vessel by the production of acid at the surface of the vessel.

5. IN THE DRAWING

Figure 2:
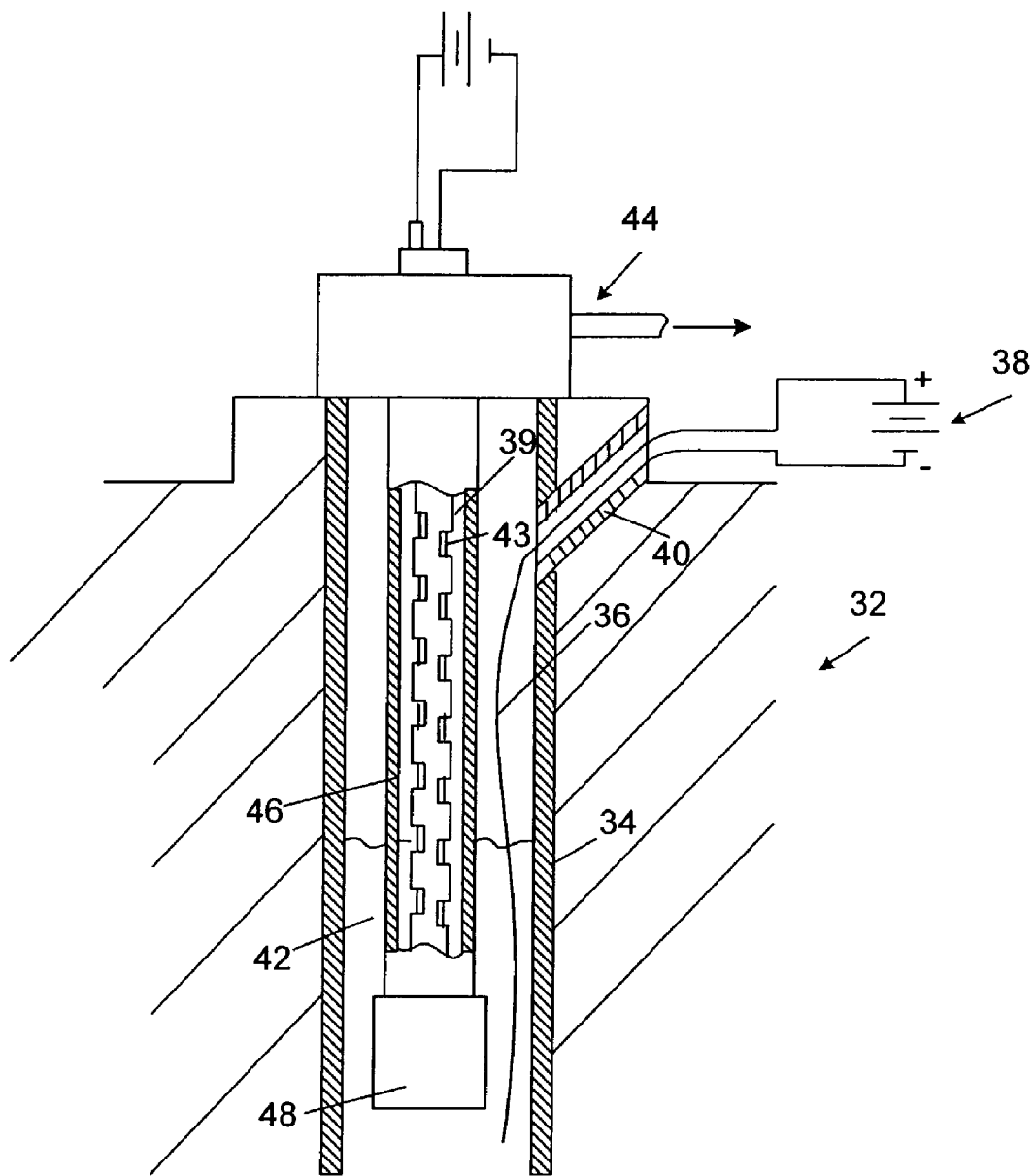

FIG. 1 illustrates the method and apparatus of the present invention as applied to a water supply pipe; and FIG. 2 illustrates the method and apparatus of the present invention applied to a well.

6. DETAILED DESCRIPTION OF THE PREFERRED EMBODIMENTS

A preferred embodiment of the present invention is illustrated in reference to FIG. 1 of the drawing. A length of electrically conductive pipe 10 is shown in a cross sectional view. Wire 14 is shown partially covered by insulation 16 and suspended in the pipe 10 by suspension apparatus 18 configured so as to allow passage of liquid through the pipe while installed to support the wire and insulation. The supports 18 can be in the form of a spoked wheel, or as illustrated in FIG. 2 of the U.S. patent application Ser. No. 09/634,164 and U.S. Pat. No. 6,103,097, the entire contents of which are incorporated herein by reference. Alternatively, the suspension apparatus 18 may be omitted. For example, in small diameter pipes, the throw of current may be sufficient regardless of where the wire is placed within the pipe. The insulation 16 is shown to have cut-away areas such as at 20, and as described in U.S. patent application Ser. No. 09/634,164. A connector 22 is shown with a pin 24 for making electrical connection with the wire 14. The materials of parts 14 and 24 are selected so as to avoid corrosion. For example, parts 14 and 24 can be of the same material so as to avoid corrosion. An electrical connection to the pipe is symbolically represented by terminal 28. A power source 26 is shown symbolically, making connection on one side with pin 24 and on the other to the terminal 28 for applying a voltage on the metal pipe 10 relative to the wire 14. The polarity of the source 26 can provide either a positive or negative voltage on the wire 14 relative to the pipe 10 depending on the need to either deposit material on the pipe or remove material, as will be fully described in the following text. This selection/choice is illustrated in FIG. 1 by the two battery symbols, illustrating the two possible polarities. The connector 22 and terminal 28 are given by way of example as a preferred embodiment for applying the source 26. Other methods and apparatus for making the required connections will be apparent to those skilled in the art, and these are also included in the spirit of the present invention.

A deposit 30 of calcium carbonate on the inside surface of the pipe 10 is indicated, as will be discussed in the following description of operation of the apparatus. The wire 14 and support system 18 of FIG. 1 is preferably configured for installation in previously installed water supply pipe. The wire may be insulated, for example as shown, or without insulation, but must be supported in a pipe with insulators so as to avoid contact with the pipe 10. The wire 14 is serving as a non-sacrificial anode when a positive voltage is placed on the wire 14 relative to the pipe 10, and as such the wire 14 is preferably constructed of a non-corrosive material, such as platinum or a metal wire coated with a non-corrosive layer such as platinum over a nobium wire.

According to the present invention, deposition of calcium carbonate on the pipe is controlled by applying a voltage between the wire 14 and the metal pipe 10. To cause deposition on the pipe, a voltage is applied of value sufficient to cause the pipe to have a potential at least −0.3 volts lower than the potential of the wire 14, and preferably −1.3 volts. Other voltage ranges are from −0.3 to −2.0 volts and −1.2 to −1.4 volts. Application of the voltage causes a current to flow between the wire 14 and the pipe 10 when the pipe contains water with some mineral content. A preferred current value according to the present invention is 0.1 milliampere per square foot of an area of the vessel wall. With a positive voltage on the wire, the pipe functions as a cathode and the wire as the anode. The current flow causes the pH of the pipe wall surface to increase dramatically due to the reduction at the anode, which causes hydroxide to be produced at the pipe/cathode, which further causes a build-up/deposit of calcium carbonate on the wall. Reversing the polarity of the voltage on the wire and pipe, i.e., a lower voltage on the wire relative to the pipe results in the opposite effect, causing deposits on the pipe to be removed. According to the present invention as explained above, it follows that an operator can control the deposit of calcium carbonate on the pipe. A thin layer of calcium carbonate on the pipe serves to protect the pipe from corrosion, and therefore the present invention is a method and apparatus for corrosion control as well as a method of control to avoid deposits that may clog the pipe.

The method and apparatus of the present invention as illustrated in FIG. 1 is a preferred embodiment. The spirit of the present invention also applies to other configurations wherein a conductive element, such as the wire 14, is placed inside a conductive vessel, such as the pipe 10 and a voltage is applied between the element and the vessel to cause the element to function as an anode or as a cathode, and the vessel to serve as a cathode or anode in order to enhance or inhibit deposition on the vessel as required.

To further explain the principle of operation as applied to the present invention, it will be understood by those skilled in the art that corrosion can occur at the anode.

Corrosion occurs as the result of two chemical half reactions. The first reaction involves the oxidation of the metallic material as follows:

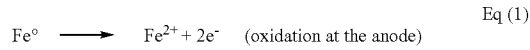
$$Fe^0 \longrightarrow Fe^{2+} + 2e^- \quad \text{(oxidation at the anode)} \quad \text{Eq (1)}$$

$$\tfrac{1}{2} O_2 + H_2O + 2e^- \longrightarrow 2OH^- \quad \text{(reduction at the cathode)} \quad \text{Eq (2)}$$

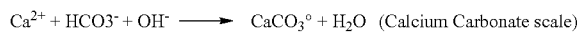
$$Ca^{2+} + HCO_3^- + OH^- \longrightarrow CaCO_3^0 + H_2O \quad \text{(Calcium Carbonate scale)} \quad \text{Eq (3)}$$

As can be seen, the hydroxide is produced by the reduction reaction at the surface of the pipe/casing wall. In 1936, Wilfred Langelier prepared an original paper entitled "An Anti Corrosion Index." This paper focused on the production of calcium carbonate scale on the surface of a pipe as a mechanism that controls corrosion of the pipe, thereby protecting the pipes wall from the corroding effects of water. The paper proposed what has now become known as the Langelier Index, wherein a positive index indicates water that is saturated with calcium carbonate and which will likely form a corrosion inhibiting scale. Water with a negative index indicates water which will not form a scale under the thermodynamic conditions in the water.

According to the present invention, water that contains under saturated levels of calcium carbonate (negative Langelier Index—i.e., insufficient calcium and carbonate to form an egg shell like scale that protects the pipe) can be forced to form a scale through use of the method and apparatus as described in reference to FIG. 1, due to the formation of the hydroxide resulting from the reduction reactions due to cathodic protection. Due to the electrochemistry of the anode/cathodic oxidation/reduction reactions and as shown in equations 2 and 3, the reduction that occurs at the cathode results in the formation of hydroxide, which in turn substantially increases the pH at the surface of the cathode. The increase in pH causes an equilibrium shift of the solubility of calcium carbonate by increasing the carbonate fraction due to disassociation of inorganic carbon in the water (also the major constituent of the alkalinity of the water).

As discussed above, placing a positive voltage on the wire relative to the pipe forces a deposition of calcium carbonate to form on the pipe, even when the water has a negative Langelier Index. Placing a positive voltage on the pipe (vessel relative to the wire (element) causes the pipe to act as an anode, which results in a corrosive effect to occur on the pipe (vessel). Applying this reversed voltage for a relatively short period of time, for example in the range of 24 to 48 hours, will cause significant removal of calcium carbonate from the pipe (vessel) wall. In other words, the oxidation/reduction reactions reverse, and scale which may have formed due to calcium carbonate saturation (positive Langelier Index) are removed and dissolved in the water column. During the reversal period some corrosion of the metallic pipe surface may be experienced; however, the degree of corrosion in 24 to 48 hours would be insignificant. If the scale is allowed to grow too thick, it will act as a dielectric insulator and will not allow for the flow of current, which makes current reversal ineffective. Thus, only thin coatings (on the order of millimeters) can be removed by this technique; however, as the technique is aimed at waters which are undersaturated with calcium (negative Langlier Index), the natural aggressiveness of the water would keep such a scale to the minimum.

In application, the partially insulated anode is inserted into new or existing pipes. Generally, it is better to clean the pipe of scale prior to insertion of the anode or insert the anode into a new pipe or well casing; however, it is not essential that cleaning be done first.

As mentioned above, the principle of the present invention is applicable to any type of conductive vessel carrying water. FIG. 2 shows the present invention applied to a well 32. The vessel in this application is a metallic pipe 34. A preferably partially insulated conductive element 36 is installed within the pipe 34. The application of an appropriate voltage as described above, illustrated symbolically by battery 38, stops corrosion and allows for controlled deposition of calcium carbonate on the casing 34 walls. A positive voltage (as shown) on the wire 36 relative to the casing 34 forces deposition on the casing, and a positive voltage on the casing relative to the wire causes removal of calcium carbonate from the pipe 34. The battery is shown connected to the casing 34 by connection of one side to a conductive portion of a vent 40, with the other side passing through the vent and into the casing interior as shown.

The fluid 42 is assumed to include water with mineral components including calcium. The fluid may also contain other components such as oil, etc. for example as in an oil well. The present invention can also be applied to control deposits on parts of the pump 44 system, such as on the external metallic pipe 46, or on a turbine pump unit 48 immersed in the liquid 42 containing water. In order to protect these parts, a voltage is applied between the parts to be protected and the wire 36. FIG. 2 also shows a wire and insulation assembly 39 in the pipe 46, similar to the element 36 or wire and insulation of FIG. 1, for controlling corrosion and deposition on the pipe 46. A connector/feedthru 41 is shown for applying a voltage 45 to the wire 43 of the assembly 39. A positive voltage on the wire relative to the part forces deposition of calcium carbonate on the part, while a negative voltage on the wire relative to the part causes removal of calcium carbonate from the part. In other words, the principles as explained above in reference to FIG. 1 also apply to the structures of FIG. 2, as well as to other vessels, and these are to be included in the spirit of the present invention. The wire/element 36 of FIG. 2 can be inserted and either hung or secured to the pump column or pipe 46 with insulators (for example). The wire and insulation assembly 39, is installed and supported, or left unsupported within the pipe 34 in a similar manner to that discussed in reference to the structure of FIG. 1.

The method and apparatus of the present invention as explained above is given as a preferred embodiment. Various other applications and variations of structure will be apparent to those skilled in the art, and these variations are to be included in the spirit of the present invention. For example, various types of conductive elements can be used instead of the partially insulated wire of the preferred embodiment. For example, the wire, if adequately supported may be free of insulation, and various methods of supporting the wire/element will be apparent. The wire may also be a conductor of any effective configuration for the application, such as a rod or plate, etc. Although FIG. 1 and FIG. 2 show particular methods of attaching a voltage supply to the wire/element and to the pipe (vessel), various other apparatus and methods will be apparent to those skilled in the art, and these are also included in the present invention. The liquid described in the application of FIG. 1 is water with a calcium content. The invention applies also to other vessels wherein the principle of the present invention may apply for controlling deposition of material on a water containing vessel wall i.e., the present invention is not limited to water supply pipes and wells.

What is claimed is:

1. A method for controlling a layer of material deposited on a vessel wall in a vessel containing water comprising:
    (a) installing an electrically conductive element in an interior volume of said vessel extending lengthwise alongside the vessel wall; and
    (b) applying a positive voltage on said element relative to said wall if said layer is to be increased in thickness; and a negative voltage on said element relative to said wall if said layer is to be decreased in thickness,
    wherein a magnitude of said voltage between said element and said vessel wall is in the range of 0.3 to 2.0 volts.

2. A method as recited in claim 1 wherein said vessel is a previously installed water pipe.

3. A method as recited in claim 1 wherein said vessel is a pipe in a well.

4. A method for controlling a layer of material deposited on a vessel wall in a vessel containing water comprising:
    (a) installing an electrically conductive element in an interior volume of said vessel extending lengthwise alongside the vessel wall; and
    (b) applying a positive voltage on said element relative to said wall if said layer is to be increased in thickness; and a negative voltage on said element relative to said wall if said layer is to be decreased in thickness,
    wherein a magnitude of said voltage between said element and said vessel wall is in the range of 1.2 to 1.4 volts.

5. A method for controlling a layer of material deposited on a vessel wall in a vessel containing water comprising:
    (a) installing an electrically conductive element in an interior volume of said vessel extending lengthwise alongside the vessel wall; and
    (b) applying a positive voltage on said element relative to said wall if said layer is to be increased in thickness; and a negative voltage on said element relative to said wall if said layer is to be decreased in thickness,
    wherein said voltage causes a magnitude of current to flow between said element and said vessel wall through said water in an amount at least equal to 0.1 milliampere per square foot of an area of said vessel wall.

* * * * *